United States Patent
Tanabe et al.

(10) Patent No.: US 10,553,101 B2
(45) Date of Patent: Feb. 4, 2020

(54) ELECTRONIC DEVICE, CONTROL METHOD, AND NON-TRANSITORY COMPUTER-READABLE MEDIUM

(71) Applicant: KYOCERA Corporation, Kyoto (JP)

(72) Inventors: Shigeki Tanabe, Yokohama (JP); Hideki Morita, Yokohama (JP); Isao Masuike, Machida (JP); Shinya Saito, Kawasaki (JP); Tetsushi Wakasa, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/197,771

(22) Filed: Nov. 21, 2018

(65) Prior Publication Data

US 2019/0096230 A1     Mar. 28, 2019

Related U.S. Application Data

(63) Continuation of application No. PCT/JP2017/019478, filed on May 25, 2017.

(30) Foreign Application Priority Data

May 25, 2016 (JP) ................................ 2016-103989

(51) Int. Cl.
| | | |
|---|---|---|
| H04M 11/00 | (2006.01) | |
| G08B 25/00 | (2006.01) | |
| H04W 4/90 | (2018.01) | |
| H04M 1/02 | (2006.01) | |

(52) U.S. Cl.
CPC ............ *G08B 25/008* (2013.01); *H04W 4/90* (2018.02); *H04M 1/0202* (2013.01); *H04M 2250/10* (2013.01); *H04M 2250/12* (2013.01)

(58) Field of Classification Search
CPC ....... G08B 25/008; G08B 21/02; H04W 4/38; H04W 4/90
See application file for complete search history.

(56) References Cited

U.S. PATENT DOCUMENTS

2017/0270762 A1*   9/2017   Liu ........................ G08B 21/02

FOREIGN PATENT DOCUMENTS

| JP | 2009-232104 A | 10/2009 |
|---|---|---|
| JP | 2009-267770 A | 11/2009 |
| JP | 2013-032932 A | 2/2013 |
| JP | 2013-125347 A | 6/2013 |
| JP | 2013-171445 A | 9/2013 |
| JP | 2015-216464 A | 12/2015 |

\* cited by examiner

*Primary Examiner* — Justin Y Lee
(74) *Attorney, Agent, or Firm* — Studebaker & Brackett PC

(57) ABSTRACT

Provided is an electronic device including a communication unit, a motion sensor, and at least one processor. The communication unit receives information for determining that a user of the electronic device is located within a predetermined area. The at least one processor determines a movement state of the user based on an input value from the motion sensor. The at least one processor executes notification processing when the determined movement state of the user is a one's own movement state and the electronic device is located in the predetermined area while a function of an earphone is being executed.

10 Claims, 6 Drawing Sheets

F I G. 1
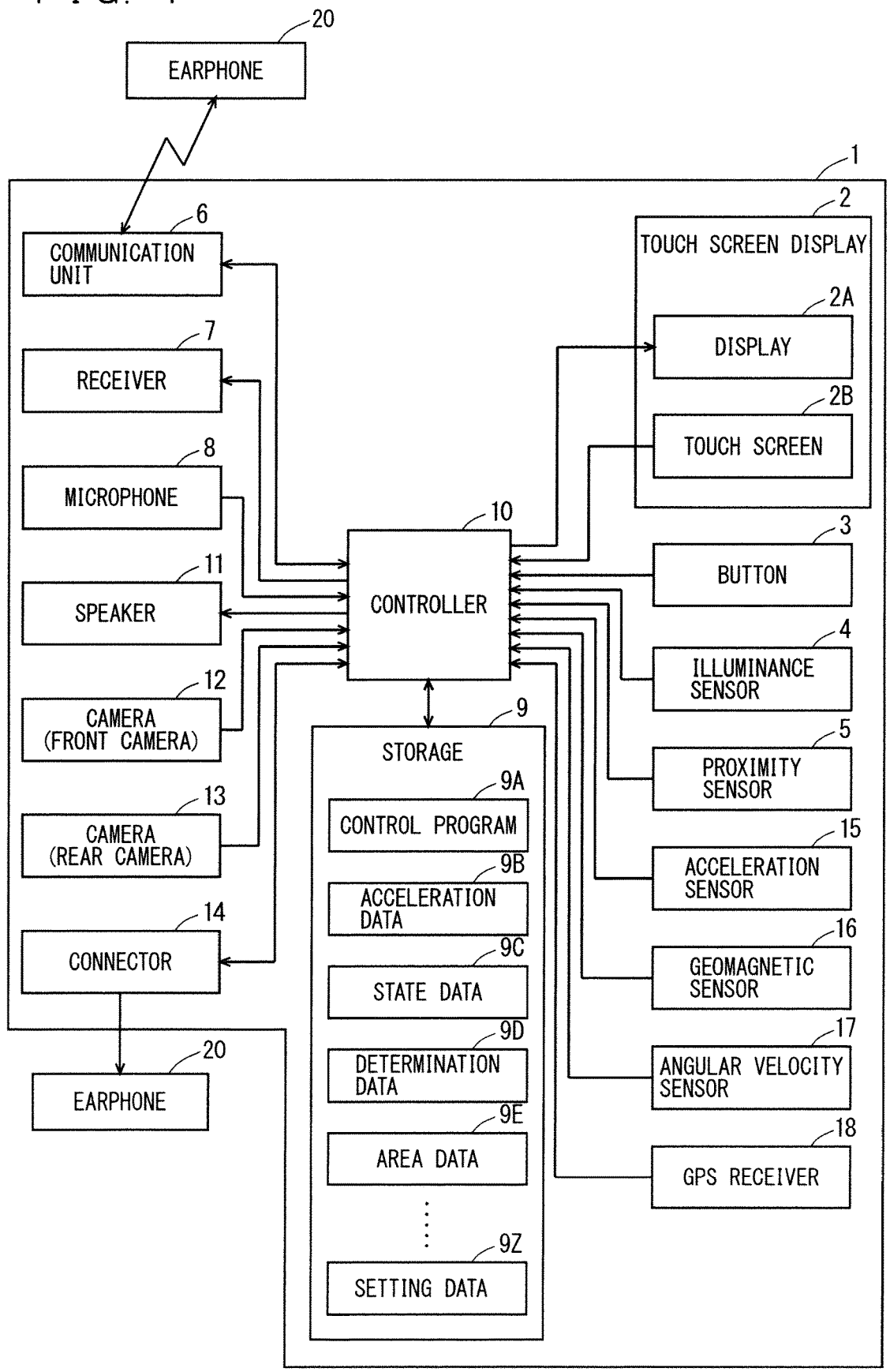

F I G. 3
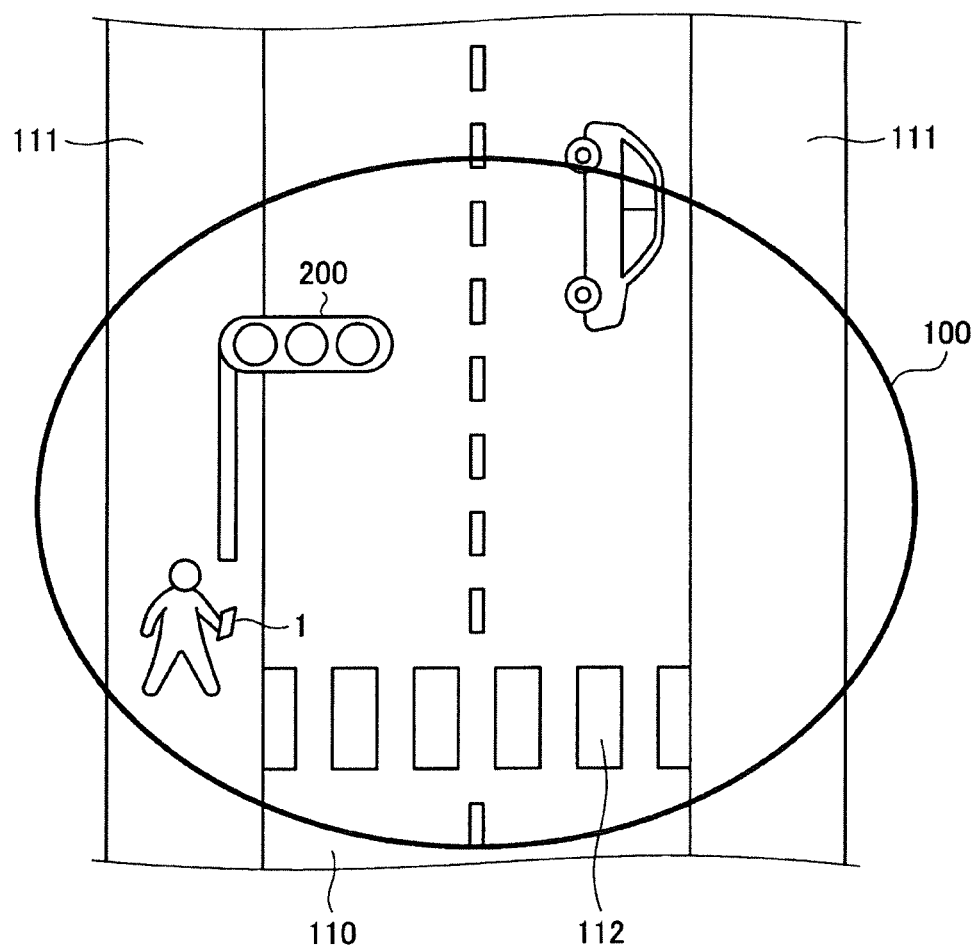

ELECTRONIC DEVICE, CONTROL METHOD, AND NON-TRANSITORY COMPUTER-READABLE MEDIUM

CROSS-REFERENCE TO RELATED APPLICATION

The present application is a continuation based on PCT Application No. PCT/JP2017/019478 filed on May 25, 2017, which claims the benefit of Japanese Application No. 2016-103989, filed on May 25, 2016. PCT Application No. PCT/JP2017/019478 is entitled "ELECTRONIC DEVICE, CONTROL METHOD, AND CONTROL PROGRAM", and Japanese Application No. 2016-103989 is entitled "ELECTRONIC DEVICE, CONTROL METHOD, AND CONTROL PROGRAM", the content of which are incorporated by reference herein in their entirety.

FIELD

The present application relates to an electronic device, a control method, and a non-transitory computer-readable medium.

BACKGROUND

There are electronic devices that can determine whether a user is moving. For example, a technique for determining a movement by a vehicle such as a train from a detection result of an acceleration sensor, and so forth is disclosed.

SUMMARY

Disclosed herein are an electronic device, a control method of the electronic device, and a non-transitory computer-readable medium. In one embodiment, An electronic device a motion sensor, a communication unit configured to receive information for determining that a user of the electronic device is located in a predetermined area, and at least one processor configured to determine a movement state of the user based on an input value from the motion sensor, and the at least one processor is configured to execute notification processing when the determined movement state of the user is a one's own movement state and determining the electronic device is located in the predetermined area while a function of an earphone is being executed.

In another embodiment, a control method is a control method for an electronic device including a motion sensor and a communication unit, the method including the steps of receiving information for determining that a user of the electronic device is located in a predetermined area by the communication unit, determining a movement state of the user based on an input value from the motion sensor, and executing notification processing when the determined movement state of the user is a one's own movement state and determining the electronic device is located in the predetermined area while a function of an earphone is being executed.

In yet another embodiment, a control program is stored in a non-transitory computer-readable medium in an electronic device to execute a process of receiving information from a communication unit of the electronic device for determining that a user of the electronic device is located in a predetermined area by the communication unit, determining a movement state of the user based on an input value from a motion sensor of the electronic device, and executing notification processing when the determined movement state of the user is a one's own movement state and determining the electronic device is located in the predetermined area while a function of an earphone of the electronic device is being executed.

BRIEF DESCRIPTION OF THE DRAWINGS

FIG. 1 illustrates a block diagram showing a functional configuration of a smartphone.

FIG. 3 is a diagram for illustrating another example of the predetermined area.

DETAILED DESCRIPTION

Figure 2:
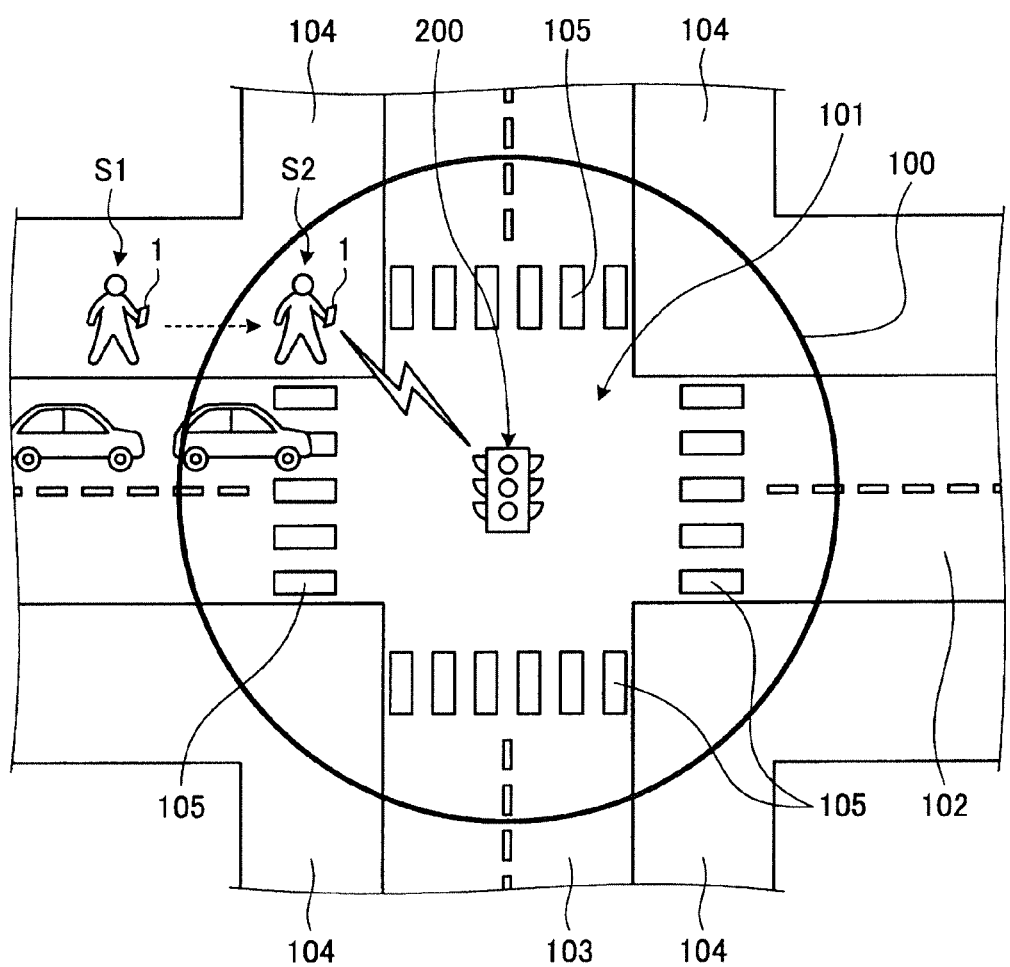
FIG. 2 is a diagram for illustrating an example of a predetermined area.

Embodiments for executing an electronic device, a control method, and a control program according to the present application will be described in detail with reference to the drawings. In the following, smartphones will be described as an example of portable electronic devices. In the following description, the same reference numerals are given to the same components in some cases. And, redundant descriptions may be omitted.

An example of a functional configuration of a smartphone 1 according to one example of a plurality of embodiments will be described with reference to FIG. 1. FIG. 1 illustrates a block diagram showing a functional configuration of the smartphone 1.

As illustrated in FIG. 1, the smartphone 1 includes a touch screen display 2, one or a plurality of buttons 3, an illuminance sensor 4, a proximity sensor 5, a communication unit 6, a receiver 7, a microphone 8, a storage 9, a controller 10, a speaker 11, a camera 12, a camera 13, a connector 14, an acceleration sensor 15, a geomagnetic sensor 16, an angular velocity sensor 17, and a Global Positioning System (GPS) receiver 18. In the following description, the smartphone 1 may be referred to as "self-device" in some cases.

The touch screen display 2 includes a display 2A and a touch screen 2B. For example, the display 2A and the touch screen 2B may overlap each other, may be positioned side by side or separated from each other. When the display 2A and the touch screen 2B overlap each other, for example, one or a plurality of sides of the display 2A may not be along either side of the touch screen 2B.

The display 2A includes a display device such as a Liquid Crystal Display (LCD), an Organic Electro-Luminescence Display (OELD), an Inorganic Electro-Luminescence Display (IELD), and so forth. The display 2A displays objects such as characters, images, symbols, graphics, and so forth.

The touch screen 2B can detect the contact or approach of the operator such as one or more fingers, one or a plurality of pens, one or a plurality of stylus pens to the touch screen 2B. The touch screen 2B can detect a position on the touch screen 2B when an operator such as one or the plurality of fingers, one or the plurality of pens, or one or the plurality of stylus pens contact or approach the touch screen 2B. The operators detected by the touch screen 2B are expressed as "finger(s)" below in some cases. In an embodiment, the touch screen 2B can appropriately employ an electrostatic capacitance method, a resistive film method, or a load detection method as a detection method.

The controller 10 can determine a type of a gesture based on a detection result detected by the touch screen 2B. The detection result includes, for example, the number of contacts, a position at which the contact is detected, a change in the position at which the contact is detected, a time length in which the contact is detected, a time interval in which the contact is detected, and the number of times the contacts are detected. The operation the controller 10 can perform can be executed by the smartphone 1 including the controller 10. In other words, the operation performed by the controller 10 may be performed by the smartphone 1. The gesture indicates an operation performed on the touch screen 2B using a finger. The operation performed on the touch screen 2B may be performed on the touch screen display 2 including the touch screen 2B. A gesture the controller 10 determines via the touch screen 2B includes, but not limited to, touch, long touch, release, swipe, tap, double tap, long tap, drag, flick, pinch in, and pinch out.

The button 3 receives an operation input from the user. Upon receiving the operation input from the user, the button 3 notifies the controller 10 that the operation input has been accepted. The number of buttons 3 may be singular or plural.

The illuminance sensor 4 can detect the illuminance. The illuminance is a value of a luminous flux incident on a unit area of a measurement surface of the illuminance sensor 4. The illuminance sensor 4 may be used, for example, for adjusting the luminance of the display 2A.

The proximity sensor 5 can detect presence of a neighboring object in a noncontact manner. The proximity sensor 5 detects the presence of an object based on a change in a magnetic field, a change in a feedback time of a reflected wave of an ultrasonic wave, or the like. The proximity sensor 5 may be used to detect, for example, that the face of the user has approached toward the display 2A. The illuminance sensor 4 and the proximity sensor 5 may be configured as one sensor. The illuminance sensor 4 may be used as a proximity sensor.

The communication unit 6 can communicate wirelessly. The communication unit 6 supports a wireless communication standard. The wireless communication standards supported by the communication unit 6 include cellular phone communication standards such as 2G (generation), 3G (generation), 4G (generation), 5G (generation) and so forth, and short-range wireless communication standards. The cellular phone communication standards include such as Long Term Evolution (LTE), Wideband Code Division Multiple Access (W-CDMA), Worldwide Interoperability for Microwave Access (WiMAX) (registered trademark), CDMA 2000, Personal Digital Cellular (PDC), Global System for Mobile Communications (GSM) (registered trademark), Personal Handy-phone System (PHS), and so forth. The short-range wireless communication standards include such as IEEE 802.11 (IEEE is an abbreviation of The institute of Electrical and Electronics Engineers, Inc.), Bluetooth (registered trademark), Infrared Data Association (IrDA), Near Field Communication (NFC), Wireless Personal Area Network (WPAN), and the like. Communication standards of WPAN include, for example, ZigBee (registered trademark), Digital Enhanced Cordless Telecommunications (DECT), Z-Wave, and Wireless Smart Utility Network (WiSun). The communication unit 6 may support one or more of the communication standards described above.

The communication unit 6 further supports, for example, a plurality of communication standards for enabling communication with a roadside device installed by a road (for example, near an intersection). An intersection includes a portion where two or more roads intersect. The communication standard includes, for example, Dedicated Short Range Communication (DSRC) that enables bidirectional communication. In one example of an embodiment, the communication unit 6 can receive a radio wave transmitted by the roadside device within a predetermined communication area. The communication unit 6 can transmit a radio wave that can be received by, for example, the roadside device and other electronic devices.

The receiver 7 can output a sound signal transmitted from the controller 10 as a sound. The receiver 7 can output, for example, the sound of a moving picture played back by the smartphone 1, the sound of music, and the voice of the other party at the time of a call. The microphone 8 can convert the voice or the like of the user input into a sound signal aid transmit it to the controller 10.

The speaker 11 can output the sound signal transmitted from the controller 10 as a sound. The speaker 11 may be used, for example, to output a ringtone and a piece of music. Either the receiver 7 or the speaker 11 may also serve as the function of the other.

The camera 12 and the camera 13 can convert the photographed image into an electric signal. The camera 12 may be a front camera that photographs an object facing the front face 2A. The camera 13 may be a rear camera that photographs an object facing the opposite face of the display 2A. The camera 12 and the camera 13 may be mounted on the smartphone 1 in a functionally and physically integrated state as a camera unit usable by switching between the front camera and the rear camera.

The connector 14 includes a terminal to which another device is connected. The connector 14 may include a general-purpose terminal such as a Universal Serial Bus (USB), a High-Definition Multimedia Interface (registered trademark) (HDMI), a Light Peak (Thunderbolt (registered trademark)), an earphone microphone connector. The connector 14 includes, for example, an earphone connection terminal. An earphone 20 connected to the earphone connection terminal can output, for example, sound information such as music stored in the storage 9 of the smartphone 1, voice of the other party at the time of calling, and so forth. In the smartphone 1, an earphone-side terminal of the earphone 20 is inserted into the earphone connection terminal, and the earphone detection unit can detect that the earphone 20 is attached to the connector 14. The earphone detection unit can detect that the earphone 20 is attached to the connector 14, for example, based on a voltage change of the terminal of the connector 14. The connector 14 may be a dedicated terminal such as a Dock connector. Devices connected to the connector 14 include, but not limited to, the earphone 20, an external storage, a speaker, and a communication device, for example. The earphone connection terminal may be configured differently from the connector 14. The smartphone 1 may be connected to the earphone 20 via a communication unit 6 by wireless communication such as short-range wireless communication and so forth.

The acceleration sensor 15 can detect the direction and magnitude of the acceleration acting on the smartphone 1. The acceleration sensor 15 can transmit the detected acceleration value to the controller 10. The controller 10 may detect a change in the movement state of the smartphone 1 based on an acceleration pattern including the direction and magnitude of the acceleration detected by the acceleration sensor 15 or a time series change in the direction and magnitude of the acceleration. The movement state will be described in detail later.

The geomagnetic sensor 16 can detect the orientation (azimuth) of the smartphone 1, for example, by measuring the geomagnetism. The geomagnetic sensor 16 can transmit the detected geomagnetic value to the controller 10. The geomagnetic sensor 16 may be either a two-axis type sensor or a three-axis type sensor. The geomagnetic sensor 16 may detect the direction and magnitude of a magnetic field. The controller 10 can detect a traveling direction of the user based on the geomagnetic value detected by the geomagnetic sensor 16.

The angular velocity sensor 17 can measure, for example, the magnitude and the direction of the angular velocity of the smartphone 1. The angular velocity sensor 17 can transmit the detected angular velocity value to the controller 10. The controller 10 can detect a change in the orientation of the smartphone 1 based on an angular velocity pattern including the magnitude and direction of the angular velocity detected by the angular velocity sensor 17 or a time series change of the direction and magnitude of the angular velocity. The controller 10 can change the azimuth of the smartphone 1 based on the change in the orientation of the smartphone 1, for example, in an environment where geomagnetism cannot be detected.

The GPS receiver 18 can detect the current position of the smartphone 1. The GPS receiver 18 receives a radio wave signal of a predetermined frequency band from a GPS satellite, demodulates the received radio wave signal, and transmits the processed signal to the controller 10. In one embodiment, the case where the smartphone 1 includes the GPS receiver 18 will be described, but it is not limited thereto. For example, the smartphone 1 may include a receiver that receives a radio wave signal from positioning satellites other than the GPS satellite. Alternatively, for example, the smartphone 1 may detect the current position based on a base station that the communication unit 6 uses for wireless communication. Further, for example, the smartphone 1 may detect the current position by using a plurality of methods in combination. The GPS receiver 18 receives information from an artificial satellite, therefore the GPS receiver 18 is a type of communication unit.

The storage 9 can store programs and data. The storage 9 may be used as a work area for temporarily storing processing results of the controller 10. The storage 9 may include any non-transitory storage medium such as a semiconductor storage medium and a magnetic storage medium. The storage 9 may include a plurality of types of storage media. The storage 9 may include a combination of a storage medium such as a memory card, an optical disk, or a magneto-optical disk and a reading device of the storage medium. The storage 9 may include a storage device used as a temporary storage area such as a Random Access Memory (RAM).

The program stored in the storage 9 includes an application executed in the foreground or the background and a basic program for supporting the operation of the application. The screen of the application is displayed on the display 2A, for example, if it is executed in the foreground. The basic program includes, for example, an Operating System (OS). The application and the basic program may be installed in the storage 9 via the wireless communication by the communication unit 6 or the non-transitory storage medium.

The storage 9 can store, for example, a control program 9A, acceleration data 9B, state data 9C, determination data 9D, area data 9E, setting data 9Z, and so forth. The acceleration data 9B includes information on the acceleration value detected by the acceleration sensor 15. The state data 9C includes information indicating the state of the smartphone 1. The determination data 9D includes information used to determine the state of the smartphone 1. The area data 9E includes information on a predetermined area. The setting data 9Z includes information on various settings related to the operation of the smartphone 1.

The control program 9A provides functions related to various control for operating the smartphone 1. The control program 9A provides a function of realizing a call by, for example, providing control functions of the communication unit 6, the receiver 7, the microphone 8, and so forth. The controller 10 can execute the following operations by executing, for example, the control program 9A.

The controller 10 controls the acceleration sensor 15 and so forth, thereby the movement state of the user carrying the smartphone 1 can be determined. The movement state includes, for example, a biped movement state in which the user is walking or running, a state in which the user is moving on a bicycle, and so forth. The biped movement state includes a walking state of the user, a running state of the user, a walking and running state of the user, and so forth.

The controller 10 can control sound output. The controller 10 can execute the function of the earphone 20. The earphone 20 includes, for example, a headphone, a head set, and so forth. The function of the earphone 20 includes a function of outputting sound (vibrating air). For example, if the earphone is connected to the connector 14, the controller 10 can control the earphone so that the sound is output from the earphone. Thus, a sound output function is executed. Further, for example, the controller 10 can execute a noise cancelling function as a function of the earphone 20. In the noise cancelling function, the controller 10 operates as follows, for example. That is, the controller 10 extracts a frequency component corresponding to the noise sound from the sound signal input from the microphone 8, generates a sound signal for canceling (or reducing) the frequency component, and outputs sound (air vibration) from the earphone 20 on the basis of the sound signal. Accordingly, in the ear of the user, the air vibration attributed to the surrounding noise sound and the air vibration from the earphone 8 cancel each other, and the noise sound that the user hears can be reduced. The controller 10 can cause the earphone to execute the sound output function and the noise cancelling function in parallel.

The controller 10 can determine whether or not the self-device is located within the predetermined area. For example, the controller 10 can receive information for determining that the self-device is located in the predetermined area. For example, the controller 10 receives the radio wave transmitted from the roadside device toward a predetermined communication area as the information by the communication unit 6, thereby determining that the self-device is located in the predetermined area. In this case, the predetermined area is the communication area of the roadside device. Hereinafter, the determination method is referred to as a first determination method.

Further, the controller 10 can provide a function of, for example, determining whether or not it is located in the predetermined area based on the current position of the self-device. The predetermined area may include, for example, the vicinity of the road. The vicinity of the road includes a roadway and a sidewalk. The predetermined area may include an area in which notification that the user has approached the dangerous place to be made. The predetermined area may include areas such as intersections and parking lots, for example. Hereinafter, the determination method is referred to as a second determination method.

If the controller 10 determines that the movement state of the user is a movement state by one's own while executing the function of the earphone and determines that the self-device is located in the predetermined area, the controller 10 can execute the notification processing. The notification processing includes, for example, a process of notifying the user of the self-device. The notification processing may include, for example, a process of notifying another electronic device.

The acceleration data 9B includes a plurality of pieces of acceleration information transmitted to the controller 10 as a detection result of the acceleration sensor 15. The acceleration data 9B can indicate a plurality of pieces of acceleration information in time series. The acceleration information includes, for example, time and an acceleration value. The time indicates a time at which the direction and magnitude of the acceleration are detected by the acceleration sensor 15. The acceleration value indicates a value of the direction and magnitude of the acceleration detected by the acceleration sensor 15.

For example, the detection result of the acceleration sensor 15 is transmitted to the controller 10. The detection result includes an acceleration value in an X axis direction, an acceleration value in a Y axis direction, an acceleration value in a Z axis direction, and a vector value obtained by composing each acceleration value. The controller 10 logs the detection result of the acceleration sensor 15 to the acceleration data 9B in the storage 9. The controller 10 may calculate the composite vector value by calculating the acceleration value in the X axis direction, the acceleration value in the Y axis direction, and the acceleration value in the Z axis direction.

The state data 9C includes information indicating the movement state of the user (self-device). The movement state includes, for example, a movement state of the user by one's own and a movement state in a vehicle. The movement state of one's own includes a walking state, a running state, and a movement state (bicycle state) on a bicycle. The walking state includes a state in Which the user carrying the smartphone 1 is walking. The running state includes a state in which the user carrying the smartphone 1 is running. The movement state on a bicycle includes a state in which the user carrying the smartphone 1 is moving on one's own on a bicycle. The term "one's own" includes human power. The movement state in a vehicle is a state in which the user carrying the smartphone 1 is moving in a vehicle. Vehicles include vehicles using powers other than bicycles such as automobiles, motorcycles, trains, buses, airplanes, and so forth. For example, the state data 9C may include a state in which the user is stopped, a state in which the self-device is placed, and so forth. The controller 10 updates the state data 9C in accordance with the detection of a change in state.

The determination data 9D includes an acceleration pattern corresponding to each of a plurality of movement states of the user. For each of a plurality of movement states of the user, it measures what type of acceleration pattern is characteristically detected by the acceleration sensor 15 in advance, and includes the measured acceleration pattern. The acceleration pattern is stored so as to correspond to the logged data of the above-described composite vector value. The determination data 9D includes, for example, an acceleration pattern corresponding to the walking state, the running state, the movement state on a bicycle, and the movement state in a vehicle.

The area data 9E includes information on the predetermined area. The area data 9E includes, for example, information indicating whether or not determined as predetermined area is the communication area where the radio wave from the roadside device can be received. If the communication area is determined as the predetermined area, the controller 10 uses the first determination method.

The area data 9E includes, for example, information for determining whether or not the self-device is located within the predetermined area based on the current position of the self-device. The area data 9E includes, for example, map information indicating the predetermined area, position information, range information, and so forth. The area data 9E may include, for example, information indicating the predetermined area corresponding to the planned travel route of the user. The area data 9E may include, for example, information on the roadside device located within the predetermined area or in the vicinity of the area.

The setting data 9Z includes various data used for processing executed based on functions provided by the control program 9A and so forth.

The controller 10 integrally controls the operation of the smartphone 1 to realize various functions. The controller 10 includes an arithmetic processing unit. The arithmetic processing unit may include, but not limited to, a Central Processing Unit (CPU), a System-on-a-Chip (SoC), a Micro Control Unit (MCU), and a Field-Programmable Gate Array (FPGA), and a processor. Other components such as the communication unit 6 may be integrated in the SoC.

The controller 10 can also be said to be a control circuit. The controller 10 includes at least one processor to provide control and processing capabilities to execute various functions, as described in further detail below.

According to embodiments, the at least one processor may be implemented as a single integrated circuit (IC) or as a plurality of communicably coupled integrated circuits IC and/or discrete circuits. The at least one processor can be implemented in accordance with various known techniques.

In one embodiment, the processor includes one or more circuits or units configured to perform one or more data calculation procedures or processes, for example, by executing instructions stored in an associated memory. In other embodiments, the processor may be firmware (for example, a discreet logic component) configured to perform one or more data calculation procedures or processes.

According to embodiments, the processor may be one or more of a processor, a controller, a microprocessor, a microcontroller, an Application-Specific Integrated Circuit (ASIC), a digital signal processor, a programmable logic device, a field programmable gate array, or any combination of the devices or configurations or combinations of other known devices and configurations may be included to perform the functions described below.

Specifically, the controller 10 executes an instruction included in the program stored in the storage 9. The controller 10 can refer to the data stored in the storage 9 as necessary. The controller 10 controls a function unit in accordance with the data and the instruction. The controller 10 realizes various functions by controlling the function unit. The function unit includes, but not limited to, the display 2A, the communication unit 6, the receiver 7, and the speaker 11, for example. The controller 10 may change the control in accordance with the detection result of the detection unit. The detection unit includes, but not limited to, the touch screen 2B, the button 3, the illuminance sensor 4, the proximity sensor 5, the microphone 8, the camera 12, the camera 13, the acceleration sensor 15, the geomagnetic sensor 16, the angular velocity sensor 17, and the GPS receiver 18, for example.

By executing, for example, the control program 9A, the controller 10 can execute various control such as changing information displayed on the display 2A in accordance with a gesture determined via the touch screen 2B.

The controller 10 cooperates with the acceleration sensor 15, the geomagnetic sensor 16, the angular velocity sensor 17, and the GPS receiver 18 by executing the control program 9A. The controller 10 executes a process of determining the movement state of the user carrying the self-device based on the detection result of the acceleration sensor 15.

The controller 10 may use the outputs of the acceleration sensor 15, the geomagnetic sensor 16, and the angular velocity sensor 17 in combination. By using a combination of the outputs from the plurality of sensors, in the smartphone 1, the controller 10 can execute control in which the movement of the self-device is highly reflected. The acceleration sensor 15, the geomagnetic sensor 16, and the angular velocity sensor 17 may be used as one motion sensor.

In FIG. 1, part or all of the programs and data stored in the storage 9 may be downloaded from another device by wireless communication by the communication unit 6. In FIG. 1, part or all of the programs and data stored in the storage 9 may be stored in a non-transitory storage medium readable by a reading device included in the storage 9. In FIG. 1, part or all of the programs and data stored in the storage 9 may be stored in a non-transitory storage medium readable by a reading device connected to the connector 14. The non-transitory storage medium includes, for example, an optical disk such as CD (registered trademark), DVD (registered trademark), Blu-ray (registered trademark), a magneto optical disk, a magnetic storage medium, a memory card, a solid state storage medium, but it is not limited thereto.

FIG. 2 is a diagram for illustrating an example of the predetermined area. With reference to FIG. 2, an example of control relating to notification by the smartphone 1 will be described. In the following description, although the subject of the operation is described as the smartphone 1, the subject of the operation may be the controller 10.

As shown in FIG. 2, the intersection 101 of the road is a place where the road 102 and the road 103 intersect each other. The sidewalks 104 are located along the road 102 and the road 103. Crosswalks 105 are located on the road 102 and the road 103 in the vicinity of the intersection 101. The roadside device 200 is located at the intersection 101. The predetermined area 100 can be a predetermined communication area in which the roadside device 200 can communicate. The smartphone 1 may determine that it is the predetermined communication area capable of communication of the roadside device 200, if the reception intensity of the radio wave output from the roadside device 200 is equal to or greater than a predetermined value. In an example shown in FIG. 2, the predetermined area 100 is an area including the intersection 101, parts of the sidewalks 104, and the crosswalks 105. The roadside device 200 transmits the radio wave to an unspecified number of electronic devices within a predetermined area 100.

In an example shown in FIG. 2, the user causes the earphone 20 of the smartphone 1 to execute the function with the earphone 20 being attached on the connector 14 of the smartphone 1. While listening to the music with the earphone 20, the user is walking on the sidewalk 104 toward the intersection 101. For example, when the user is listening to the music with the earphones 20 worn on both ears, the user may not be able to hear ambient sound (for example, approaching sound of a vehicle). Furthermore, when the user is preoccupied with the operation of the smartphone 1 or the music, the user may be delayed in sensing immediate danger in the surroundings. In addition, the user may be walking, running, etc. while listening to music without operating the smartphone 1. Therefore, the smartphone 1 performs notification processing shown in a following example.

In step S1, the user is walking while listening to the music with the earphone 20 on the sidewalk 104 that is outside the predetermined area 100. In this case, the smartphone 1 cannot receive the radio wave transmitted from the roadside device 200 at the intersection 101 to the predetermined area 100 by the communication unit 6. Upon detecting that the earphone 20 is attached to the connector 14, the smartphone 1 determines the movement state of the user of the self-device. The smartphone 1 compares the acceleration pattern detected by the acceleration sensor 15 with the determination data 9D, and determines that the movement state of the user of the smartphone 1 is the walking state. The smartphone 1 determines whether the self-device is located in the predetermined area 100. For example, based on the presence or absence of the reception of radio wave from the roadside device 200, the smartphone 1 determines that the self-device is not located in the predetermined area 100. In this case, the smartphone 1 does not execute the notification process.

In step S2, the user continues walking on the sidewalk 104 and enters, from the outside of the predetermined area 100, the inside thereof. In this case, the smartphone 1 can receive the radio wave transmitted from the roadside device 200 at the intersection 101 to the predetermined area 100 by the communication unit 6. If the function of the earphone 20 continues to be executed, the smartphone 1 determines the movement state of the user of the self-device. The smartphone 1 compares the acceleration pattern detected by the acceleration sensor 15 with the determination data 9D, and determines that the movement state of the user of the smartphone 1 is the walking state. The smartphone 1 determines whether the self-device is located in the predetermined area 100. The smartphone 1 determines whether the self-device is located in the predetermined area 100 in response to the reception of radio wave from the roadside device 200 by the communication unit 6, The smartphone 1 notifies the user of a possible accident by executing the notification process. For example, the smartphone 1 causes the earphone 20 to output a voice or a notifying sound indicating, the possible accident to the user. In this case, the smartphone 1 may stop the output of the sound from the earphone 20 other than the notification sound, or reduce the volume of the sound other than the notification sound. For example, the smartphone 1 may cause the display 2A to display information indicating the possible accident to the user if there is a user's operation on the user's own machine. For example, when the smartphone 1 includes a vibrator, the vibrator may be vibrated as the notification process. The smartphone 1 may notify the user of the possible accident by using the vibrator in a vibration mode that is different from a notification method at the time of incoming calls, mails, and so forth. For example, the smartphone 1 may vibrate the vibrator with stronger vibration than vibration at the time of incoming calls, mails, etc. when notifying the user of the possible accident. The stronger vibration referred to here is vibration that is high in at least one of amplitude and frequency thereof.

FIG. 3 is a diagram for illustrating another example of the predetermined area. As shown in FIG. 3, the roadside device 200 may be located in the vicinity of the road 110. Sidewalks 111 are located along the road 110. A crosswalk 112 is located on the road 110 so as to connect the sidewalks 111 on both sides thereof. In an example shown in FIG. 3, the predetermined area 100 is an area including the road 111, the sidewalks 111, and the crosswalk 112. For example, the predetermined area 100 may be set to include places where the user may cross the road 110. For example, the predetermined area 100 may be set to include a place where a traffic accident occurred in the past, a place where there is a possible traffic accident, and so forth.

In the example shown in FIG. 3, the user enters the predetermined area 100 while walking on the sidewalk 111 with the earphone 20 worn. In this case, the smartphone 1 can receive the radio wave transmitted from the roadside device 200 in the vicinity of the road 110 to the predetermined area 100 by the communication unit 6. If the function of the earphone 20 continues to be executed, the smartphone 1 determines the movement state of the user of the self-device. The smartphone 1 compares the acceleration pattern detected by the acceleration sensor 15 with the determination data 9D, and determines that the movement state of the user of the smartphone 1 is the walking state. The smartphone 1 determines whether the self-device is located in the predetermined area 100. The smartphone 1 determines whether the self-device is located in the predetermined area 100 in response to the reception of radio wave from the roadside device 200 by the communication unit 6. The smartphone 1 notifies the user of the possible accident by executing the notification process.

As described above, if the user wearing the earphone 20 is determined to be in the movement state of one's own and to be located in the predetermined area 100, the smartphone 1 can urge the user to see the circumstances by notifying the user. For example, when the user is in the movement state of one's own with the earphone 20 worn, less attention is payed to the surrounding environment as compared with the case where the earphone 20 is not worn. Therefore, the smartphone 1 contributes to reduction of accidents of the user approaching a dangerous place by notifying the user at the timing when entering the predetermined area 100 in a state where the less attention is payed to the surrounding environment. Furthermore, by restricting the notification if the self-device is located in the predetermined area 100, the smartphone 1 can suppress deterioration in convenience.

Figure 4:
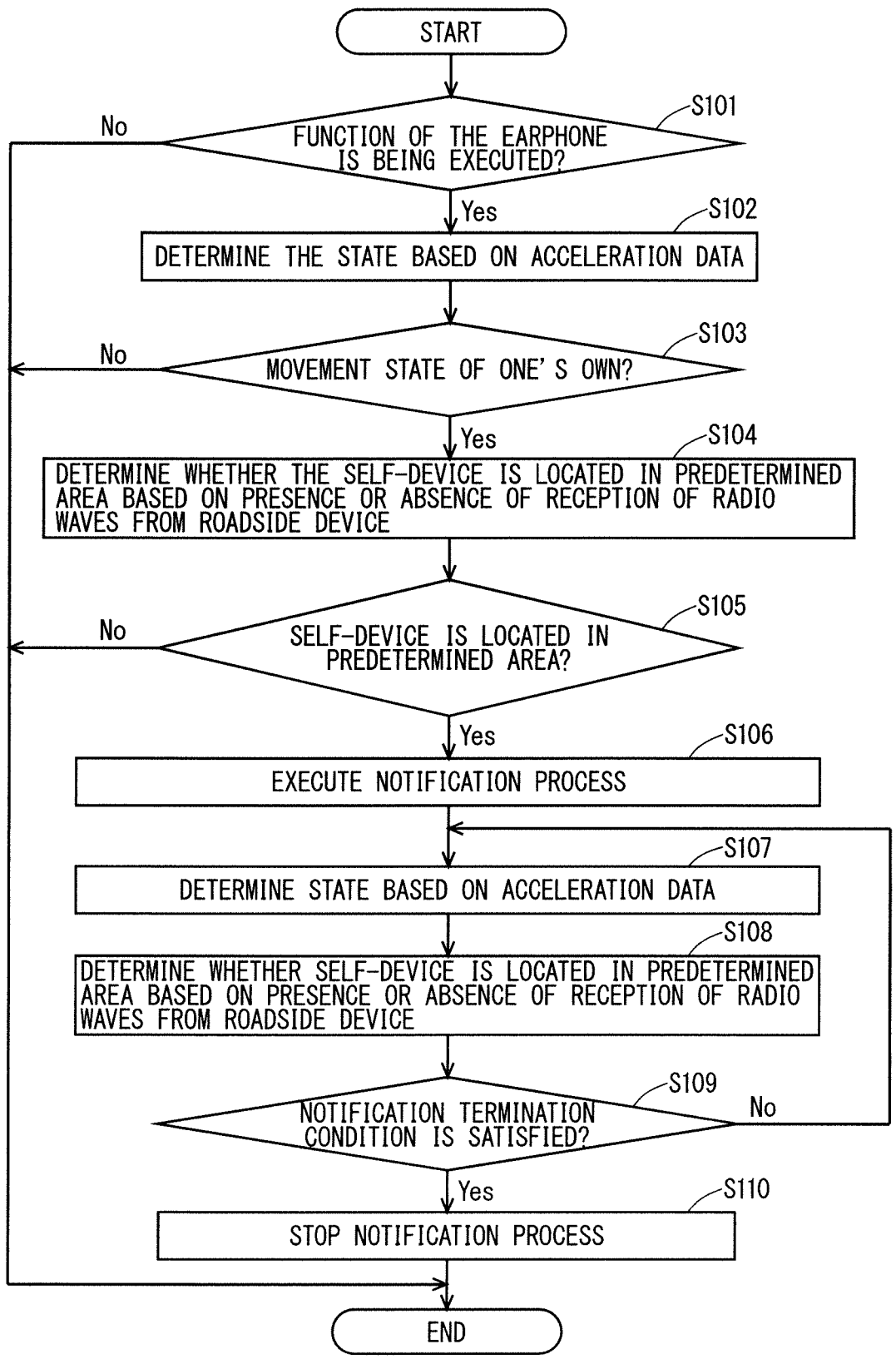
FIG. 4 is a flowchart showing a processing procedure of an example of control by the smartphone.

FIG. 4 is a flowchart showing a processing procedure of an example of control by the smartphone 1. The processing procedure shown in FIG. 4 is realized by executing the control program 9A by the controller 10. The processing procedure shown in FIG. 4 is repeatedly executed by the controller 10.

As shown in FIG. 4, in step S101, the controller 10 of the smartphone 1 determines Whether or not the function of the earphone 20 is being executed. If the controller 10 determines that the function of the earphone 20 is not being executed in step S101), the controller 10 ends the processing procedure shown in FIG. 4. If the controller 10 determines that the function of the earphone 20 is being executed (Yes in step S101), the process proceeds to step S102.

In step S102, the controller 10 determines the state based on the acceleration data 9B. For example, the controller 10 compares the acceleration pattern of the acceleration data 9B with the acceleration pattern of each state of the determination data 9D, and determines the state corresponding to the acceleration pattern of the matching determination data 9D as the state of the smartphone 1. The controller 10 stores the determined state in the state data 9C.

If the determination result of step S102 is not the movement state of one's own (No in step S103), the controller 10 ends the processing procedure shown in FIG. 4. If the determination result of step S102 is the movement state of one's own (Yes in step S103), the controller 10 advances the process to step S104.

In step S104, the controller 10 determines whether the self-device is located in the predetermined area 100 based on the presence or absence of the reception of radio wave from the roadside device 200 in the communication unit 6. For example, if the communication unit 6 is receiving the radio wave from the roadside device 200, the controller 10 determines that the self-device is located in the predetermined area 100. If the communication unit 6 does not receive the radio wave from the roadside device 200, the controller 10 determines that the self-device is not located in the predetermined area 100.

If the determination result of step S104 is that the self-device is not located in the predetermined area 100 (No in step S105), the controller 10 ends the processing procedure shown in FIG. 4. If the determination result of step S104 is that the self-device is located in the predetermined area (Yes in step S105), the controller 10 advances the process to step S106. In step S106, the controller 10 executes the notification processing described above, Upon executing the notification process, the controller 10 advances the process to step S107. In this case, the smartphone 1 is in a state of notifying the user.

In step S107, the controller 10 determines the state based on the acceleration data 9B. In step S108, the controller 10 determines whether the self-device is located in the predetermined area 100 based on the presence or absence of the reception of radio wave from the roadside device 200 in the communication unit 6.

In step S109, the controller 10 determines whether a notification termination condition is satisfied. The notification termination condition includes, for example, detection of the end of the function of the earphone 20, detection of detachment of the earphone 20, power off of the smartphone 1, detection of a change in the movement state, determination that the self-device is not located in the predetermined area 100 (notification termination condition), and so forth. For example, if at least one of the notification termination conditions is detected, the controller 10 determines that the notification termination condition is satisfied. If the controller 10 determines that the notification termination condition is not satisfied (No in step S109), the controller 10 returns the process to step S107 described above.

If the controller 10 determines that the notification termination condition is satisfied (Yes in step S109), the process proceeds to step S110. The controller 10 stops the notification processing in step S110. If the notification processing is stopped, the controller 10 ends the processing procedure shown in FIG. 4.

In the processing procedure shown in FIG. 4, the description is made that the controller 10 sequentially executes determination that whether or not the function of the earphone 20 is being executed, determination that whether or not the movement state is the movement state of one's own, and determination that whether or not the user is located in the predetermined area, but the processing procedure is not limited thereto. For example, in the processing procedure shown in FIG. 4, the determination that whether or not the user is located in the predetermined area, the determination that whether or not the movement state is the movement state of one's own, and the determination that whether or not the function of the earphone 20 is being executed may be changed in the order.

Figure 5:
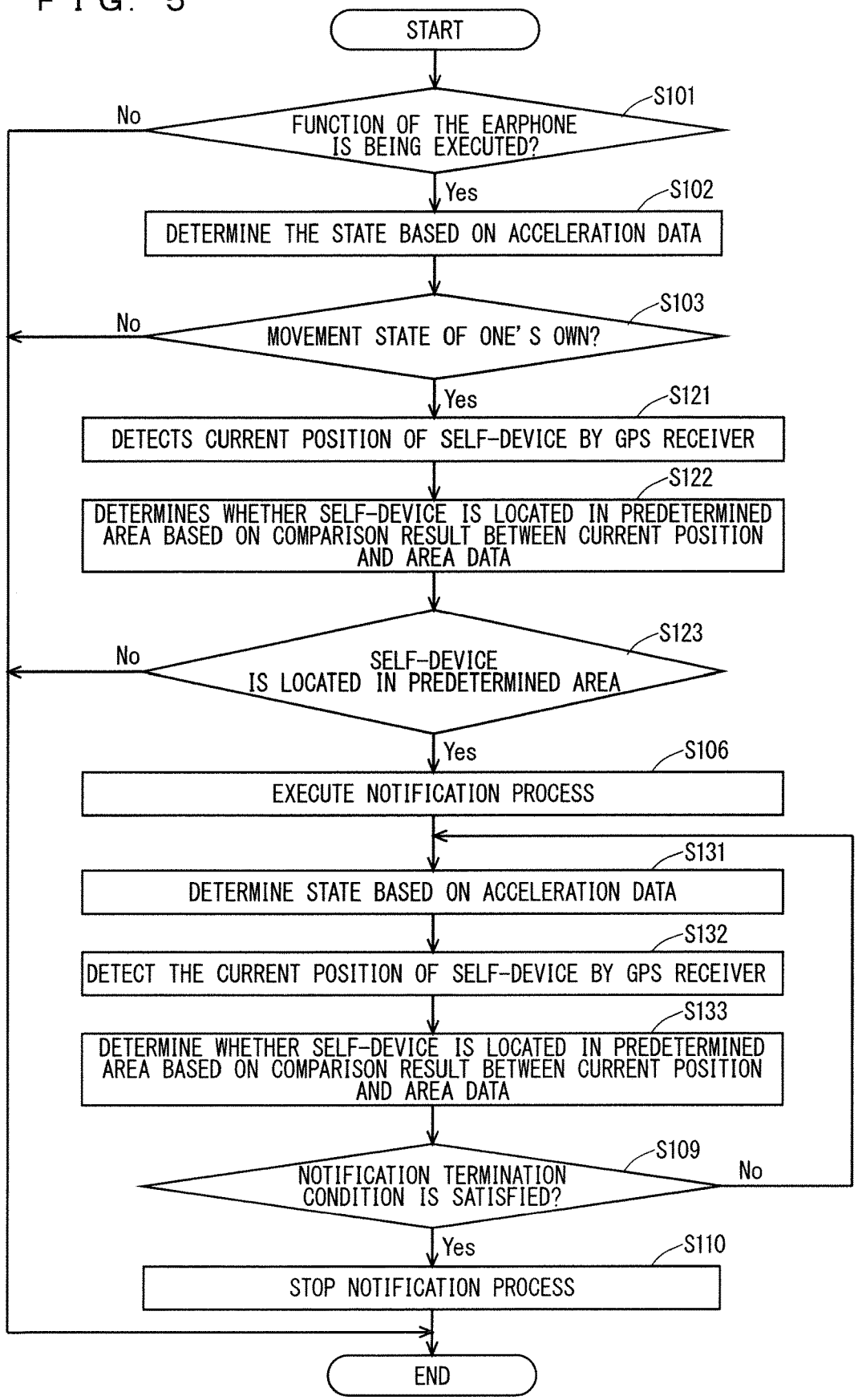
FIG. 5 is a flowchart showing a processing procedure of another example of control by the smartphone.

FIG. 5 is a flowchart showing a processing procedure of another example of control by the smartphone 1. The processing procedure shown in FIG. 5 is realized by executing the control program 9A by the controller 10.

In the example shown in FIG. 5, the processes from Step S101 to Step S103, Step S106, Step S109, and Step S110 are the same as the processes from Step S101 to Step S103, Step S106, Step S109, and Step S110 shown in FIG. 4, therefore, only different parts will be explained, and description of the same parts will be omitted.

If the determination result of step S102 is the movement state of one's own (Yes in step S103), the controller 10 advances the process to step S121. In step S121, the controller 10 detects the current position of the self-device by the GPS receiver 18. In step S122, the controller 10 determines whether the self-device is located in the predetermined area 100 based on the comparison result between the current position and the area data 9E. For example, if the area data 9E includes information indicating a plurality of predetermined areas 100, the controller 10 specifies a predetermined area 100 including the current position. If the controller 10 can specify the predetermined area 100 including the current position among the plurality of predetermined areas 100, the controller 10 determines that the self-device is located in the predetermined area 100.

If the determination result of step S122 is that the self-device is not located in the predetermined area 100 (No in step S123), the controller 10 ends the processing procedure shown in FIG. 5. If the determination result of step S122 is that the self-device is located in the predetermined area (Yes in step S123), the controller 10 advances the process to step S106. In step S106, the controller 10 executes the notification processing described above. Upon executing the notification process, the controller 10 advances the process to step S131. In this case, the smartphone 1 is in a state of notifying the user.

In step S131, the controller 10 determines the state based on the acceleration data 9B. In step S132, the controller 10 detects the current position of the self-device by the GPS receiver 18. In step S133, the controller 10 determines whether the self-device is located in the predetermined area 100 based on the comparison result between the current position and the area data 9E. The controller 10 executes the processing from step S109 onward described above.

As described above, if the smartphone 1 determines that the current position detected by the GPS receiver 18 is located in the predetermined area 100, the smartphone 1 can urge the user to see the circumstances by notifying the user. As a result, the smartphone 1 notifies that the user has approached a dangerous area such as a road, a parking lot and so forth Where the roadside device 200 is not installed at a timing suitable for the movement state of the user of one's own, thereby contribution can be made to the reduction of an accident of the user approaching a dangerous place. The smartphone 1 can urge the user wearing the earphone to see the circumstances also in the predetermined area 100 where the roadside device 200 is not installed.

For example, the smartphone 1 may be configured to be capable of executing at least one of the processing procedures shown in FIGS. 4 and 5. For example, the smartphone 1 may be configured to be capable of executing the processing procedures shown in FIGS. 4 and 5 in parallel.

Figure 6:
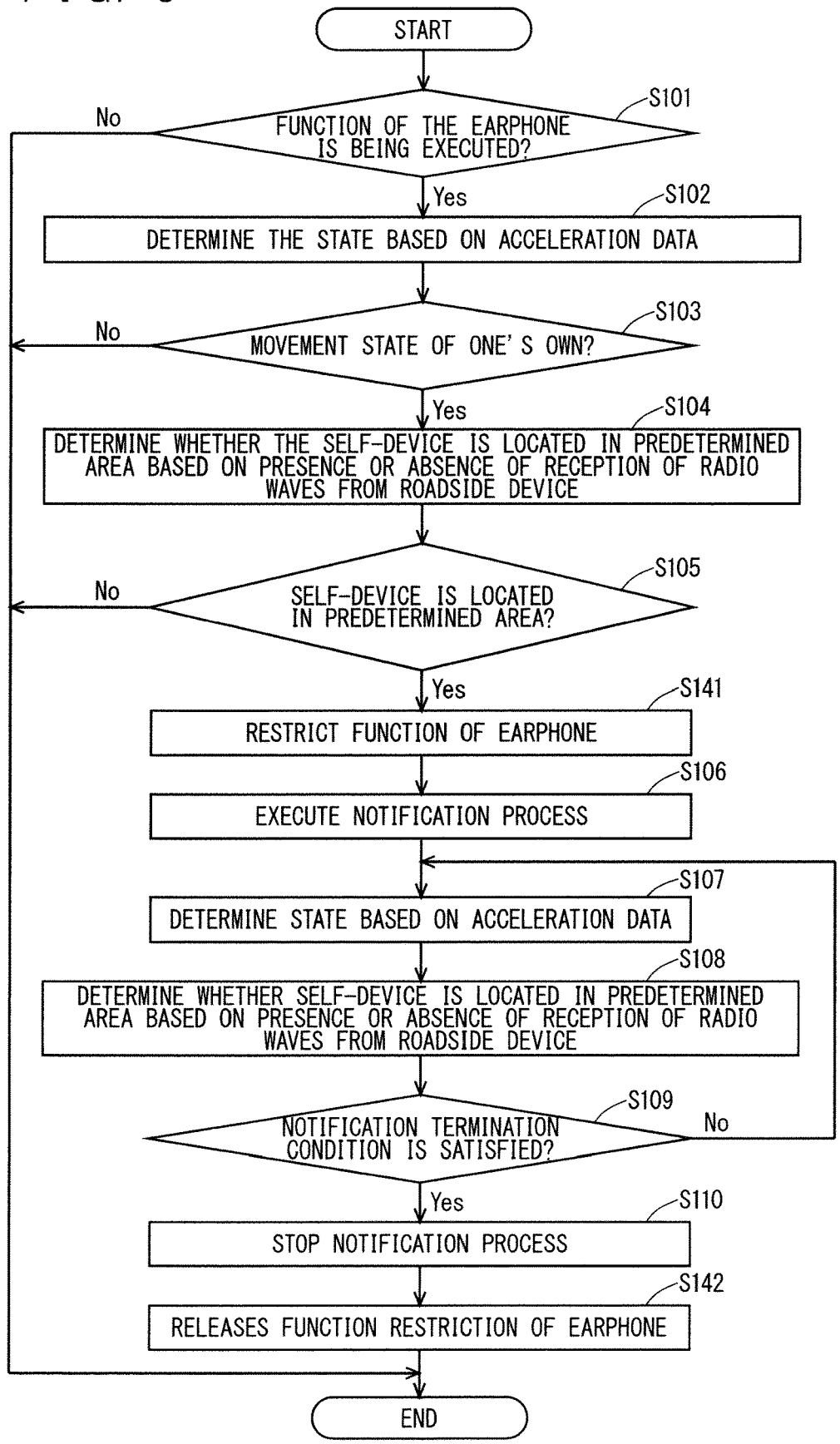
FIG. 6 is a flowchart showing a processing procedure of another example of the control by the smartphone.

FIG. 6 is a flowchart showing a processing procedure of another example of control by the smartphone 1. The processing procedure shown in FIG. 6 is realized by executing the control program 9A by the controller 10.

In an example shown in FIG. 6, the processes from step S101 to step S110 are the same as the processes from step S101 to step S110 shown in FIG. 4, only different parts will be described, and description of the same parts will be omitted.

If the determination result of step S104 is that the self-device is located in the predetermined area 100 (Yes in step S105), the controller 10 advances the process to step S141. In step S141, the controller 10 executes restriction processing for restricting the function of the earphone. For example, if the noise canceling function is being executed, the controller 10 may temporarily stop the noise canceling function so that the user can hear surrounding sounds. Alternatively, for example, if the controller 10 is executing a music playback function, the controller 10 may temporarily stop the music playback function or reduce the volume.

In short, the controller 10 limits the output from the earphone in the restriction processing. Specifically, for example, the controller 10 may reduce the sound volume of the sound output from the earphone in the restriction processing to be smaller than the sound volume when the restriction processing is not performed. Further, the controller 10 may stop the output of the earphone in the restriction processing. By stopping the output, the earphone does not output sound (does not vibrate the air), and the sound output function and the noise cancelling function are stopped. Such restriction of the output of the earphone makes the user readily hear the surrounding sound.

If the function of the earphone is restricted, the controller 10 executes the processing from step S106 onward described above. That is, the notification processing in step S110 and the restriction processing in step S141 are executed in parallel.

If the controller 10 stops the notification processing in step S110, in step S142, the controller 10 releases the function restriction of the earphone. For example, if the noise cancellation function is restricted, the controller 10 releases the restriction of the noise cancellation function. For example, if the music playback function is stopped, the controller 10 resumes the music playback function. If the controller 10 releases the function restriction of the earphone, the controller 10 ends the processing procedure shown in FIG. 6.

As described above, the smartphone 1 can make the user readily hear the notifying sound and the surrounding sound by restricting the function of the earphone being executed if executing the notification processing. As a result, the smartphone 1 can contribute to reduction of an accident of the user approaching the dangerous place by letting the user wearing the earphone hear the notifying sound and the surrounding sound.

In an above embodiment, the case where the predetermined area 100 includes an intersection or a predetermined dangerous area has been described, but the smartphone 1 is not limited thereto. For example, the smartphone 1 may set an area close to an intersection, a dangerous point, a road, or the like to the predetermined area 100. The controller 10 may set each different area corresponding to each movement state of the user to the predetermined area 100. For example, the predetermined area 100 may gradually spread the area in the order of the movement state in walking, the movement state in naming, and the movement state on a bicycle. That is, the controller 10 sets the narrowest area to the predetermined area 100 corresponding to the walking state, sets the next wider area to the predetermined area 100 corresponding to the walking state, and the widest area to the predetermined area 100 corresponding to the bicycle state. Information indicating the relationship between the movement state and the area is included in the area data 9E. The outline of the area corresponding to the running state may surround the outline of the area corresponding to the walking state. Similarly, the outline of the area corresponding to the bicycle state may surround the outline of the area corresponding to the running state.

And if the controller 10 determines that the movement state of the user is the walking state, running state or bicycle state during execution of the earphone function, the controller 10 determines whether the user is located in the area 100 corresponding to the movement state, and if determined that the user is located in this area 100, the controller 10 executes the notification processing. Accordingly, the notification processing is executed in a wider area as the moving speed of the user is higher.

Now, if the area 100 is constant in size regardless of the movement state, the time required for the user to move from the end of the area 100 to a dangerous point such as an intersection in the area 100 is shorter as the moving speed is higher. That is, when the user is riding a bicycle, the user enters a dangerous point such as an intersection in a short time after receiving the notification. Therefore, the time that allows the user to spend for responding in accordance with the notification may be short, in some cases. Whereas, the area 100 corresponding to the bicycle state is set wider than the area 100 corresponding to another movement state (for example, the walking state), thereby the user can receive the notification at a timing sufficiently earlier than the timing at which the user enters the dangerous point (for example, an intersection).

Conversely, unnecessary notification can be suppressed by setting the area 100 corresponding to the walking state with a low moving speed narrow, for example. Consider the case where the area 100 corresponding to the walking state is set wide for comparison. In this case, the smartphone 1 notifies even at a timing far before a timing at which the user enters the dangerous point such as an intersection, therefore such a notification has little meaning. Whereas, unnecessary notification can be suppressed by setting the area 100 corresponding to the walking state with a low moving speed narrow.

In an above embodiment, the case where the smartphone 1 notifies the user as the notification processing has been described, but the smartphone 1 is not limited thereto. For example, the smartphone 1 may notify other electronic devices. For example, by performing the notification processing, the smartphone 1 may transmit the radio wave for calling attention of the user of the self-device by other electronic device from the communication unit 6 to an unspecified number of other electronic devices in the surroundings of the self-device. The other electronic device includes, for example, the roadside device 200, an on-vehicle device mounted on a vehicle, and so forth.

Although the smartphone 1 has been described as an example of an electronic device in embodiments described above, an electronic device according to the appended claims is not limited to a smartphone. The electronic device according to the appended claims may be an electronic device other than the smartphone 1. Electronic devices include, but not limited to, mobile phones, tablets, portable personal computers, digital cameras, media players, electronic book readers, navigators, and game consoles, for example.

In an example of FIG. 6, although both of the processing of step S141 and step S106 are executed, step S106 may not be executed.

Complicated embodiments have been described for completely and clearly disclosing portable electronic devices. However, the portable electronic device should not be limited to the above-described embodiments, and should be configured to embody the configuration in which all modifications and alternatives that can be created by those skilled in the art within the scope of the basic matter described in the specification are applicable.

The invention claimed is:

1. An electronic device, comprising:
a motion sensor;
a receiver configured to receive information for determining that the electronic device is located in a predetermined area; and
at least one processor configured to:
determine a movement state of a user of the electronic device based on an input value from the motion sensor; and
execute notification processing when the determined movement state of the user is a one's own movement state, the electronic device is located in the predetermined area, and a function of an earphone is being executed, wherein
the at least one processor is configured to determine that the electronic device is located in the predetermined area based on the information received by the receiver and map information.

2. The electronic device according to claim 1, wherein the notification processing includes a process to notify the user of a possible accident.

3. The electronic device according to claim 1, wherein the at least one processor is further configured to determine that the electronic device is located in the predetermined area when a radio wave is received from equipment transmitting the radio wave that can be received by a device within the predetermined area.

4. The electronic device according to claim 1, wherein the predetermined area includes a vicinity of a road.

5. The electronic device according to claim 1, wherein the at least one processor is configured to execute, in parallel, restriction processing for restricting an output of the earphone and the notification processing.

6. The electronic device according to claim 5, wherein the restriction processing includes controlling a sound volume of a sound output from the earphone to be smaller than the sound volume when the restriction processing is not performed.

7. The electronic device according to claim 5, wherein the restriction processing includes stopping the output of the earphone.

8. The electronic device according to claim 1, wherein the at least one processor is configured to
set the predetermined area to a first area when the one's own movement state of the user is a walking state, and
set the predetermined area to a second area that is wider than the first area when the one's own movement state of the user is a running state or a riding-a-bicycle state.

9. A control method for an electronic device, the electronic device including a motion sensor and a receiver, the method comprising:
receiving information for determining that a user of the electronic device is located in a predetermined area by the receiver;

determining a movement state of a user of the electronic device based on an input value from the motion sensor; and executing notification processing when the determined movement state of the user is a one's own movement state, the electronic device is located in the predetermined area, and a function of an earphone is being executed, wherein the information received by the receiver and map information are used to determine that the electronic device is located in the predetermined area.

10. A non-transitory computer-readable medium storing a control program in an electronic device to execute a process of:

receiving information from a receiver of the electronic device for determining that the electronic device is located in a predetermined area;

determining a movement state of a user of the electronic device based on an input value from a motion sensor of the electronic device; and executing notification processing when the determined movement state of the user is a one's own movement state, the electronic device is located in the predetermined area, and a function of an earphone of the electronic device is being executed, wherein the information received by the receiver and map information are used to determine that the electronic device is located in the predetermined area.

* * * * *